United States Patent [19]

Burchill et al.

[11] Patent Number: 5,110,626
[45] Date of Patent: * May 5, 1992

[54] U.V. STABILIZED ARTICLE

[75] Inventors: Michael T. Burchill, Cranbury; Joseph Silbermann, Old Bridge, both of N.J.

[73] Assignee: Atochem North America, Inc., Somerville, N.J.

[ * ] Notice: The portion of the term of this patent subsequent to Sep. 13, 2005 has been disclaimed.

[21] Appl. No.: 373,656

[22] Filed: Jun. 29, 1989

Related U.S. Application Data

[62] Division of Ser. No. 945,757, Dec. 23, 1986, abandoned.

[51] Int. Cl.⁵ ............................................. B05D 5/00
[52] U.S. Cl. ................................. 427/160; 427/331; 427/336; 427/353; 427/377; 427/430.1; 427/434.2
[58] Field of Search ............... 427/160, 331, 336, 353, 427/377, 430.1, 434.2

[56] References Cited

U.S. PATENT DOCUMENTS

| | | | |
|---|---|---|---|
| 3,043,709 | 7/1962 | Amborski | 117/7 |
| 3,297,462 | 1/1967 | Fanning | 117/33.3 |
| 3,519,462 | 7/1970 | Christian | 117/33.3 |
| 3,783,011 | 1/1974 | Chauffoureaux | 117/10 GR |
| 3,892,889 | 7/1975 | Cohman | 427/160 |
| 4,126,660 | 11/1978 | Lempkowicz et al. | 264/101 |
| 4,146,658 | 3/1979 | Humphrey | 427/160 |
| 4,323,597 | 5/1982 | Chilton | 117/160 |
| 4,325,989 | 4/1982 | Honsberg | 427/160 |
| 4,349,607 | 9/1982 | Ching | 428/412 |
| 4,362,895 | 12/1982 | Gupta et al. | 428/334 X |

FOREIGN PATENT DOCUMENTS

| | | |
|---|---|---|
| 612206 | 1/1961 | Belgium . |
| 2808005 | 8/1979 | Fed. Rep. of Germany . |
| 2808036 | 8/1979 | Fed. Rep. of Germany . |
| 39037 | 11/1975 | Israel . |

OTHER PUBLICATIONS

Katz, M. et al., A.C.S. Div. Org. Coatings & Plastics, (1976) 36, (1) 202-206.
Katz, M. et al., Soc. Plast. Eng., Technical Papers (1976) 22, pp. 511-512.

Primary Examiner—Janyce Bell
Attorney, Agent, or Firm—Finnegan, Henderson, Farabow, Garrett & Dunner

[57] ABSTRACT

What is described herein is a surface modified U.V. stabilized article which includes a resinous sheet whose sides are both exposed to the air. The surface region of one side of the sheet is substantially fully modified in situ with a stabilizing amount of an ultraviolet light stabilizer material, while the exposed surfaces are substantially free of residual stabilizer and solvent material, and the appearance and degree of surface perfection of the modified side are substantially the same as that of the unmodified side of the sheet.

The U.V. stabilized resin article is made by a continuous process comprising immersing a resin body in a suitable liquid media, contacting the surface of the immersed body through the liquid with a solution of a ultraviolet light stabilizer in a suitable organic solvent, and displacing residual stabilizer and solvent from the modified surface in situ.

10 Claims, 4 Drawing Sheets

U.V. STABILIZED ARTICLE

This application is a division of application Ser. No. 945,757, filed Dec. 23, 1986, now abandoned.

BACKGROUND OF INVENTION

1. Field of the Invention

This invention relates to U. V. stabilized articles, and, more particularly, to a PVC resinous sheet having its surface modified with a U. V. stabilizer.

2. Description of the Prior Art

Photodegradation of many types of solid polymeric articles by U. V. light has been a continual problem confronting the industry. Such U. V. degradation causes discoloration, embrittlement and deterioration of the article. Accordingly, U. V. absorber compounds have been incorporated into such polymeric articles in an attempt to provide effective stabilization to U. V. light.

However, since photodegradation is known to be a surface phenomenon, such incorporation of U. V. stabilizers into the polymeric material prior to shaping into solid form has been largely uneconomical and inefficient because the stabilizer is present substantially in the interior of the shaped article, where it does not function effectively to prevent surface photodegradation.

Accordingly, surface treatments have been proposed to provide more effective U. V. protection for such resins. These treatments are based on the ability of various organic solvents to swell such resins as polyvinyl chloride. This swelling property enables the ultraviolet light stabilizer material to be directed principally into the surface region of the resin body. However, none of these surface treatments has been very successful commercially. Another surface method comprises laminating the surface of the polymer with a layer of a film-forming material containing the U. V. stabilizer. This lamination approach, unfortunately, suffers from the problems of incompatibilities between polymer, U. V. stabilizer, and the film-forming material and its carrier components. Furthermore, the laminated layer and the surface of the polymer do not adhere well, and delamination upon shock or impact is a serious problem.

The swelling method is described by Katz, et al. in an article in the "Proceedings of the A. C. S. Div. of Org. Coatings and Plastics" 36, (1) p. 202-205 (1976), entitled "Ultraviolet Protection of Transparent PVC by Diffusion Coatings". Katz uses a dip method to impregnate a transparent PVC sheet to a given depth with a non-migrating ultraviolet light absorber. The dip technique comprises swelling the polymer with a carrier solvent, infusing the stabilizer from a solution thereof with the carrier, and, thereafter heating the treated polymer in air at an elevated temperature to drive the stabilizer below the surface of the polymer and to remove residual solvent. Under these process conditions, however, only a small amount of stabilizer is absorbed into the surface region. Furthermore, the dip method produces a product in which both sides of the sheet are modified with ultraviolet absorber.

Jochanan, in Israeli Patent No. 39037, published Nov. 10, 1975, entitled "U. V.- and Oxidation-Proof Products from Organic Plastics and their Manufacture", describes various methods of applying a solution or suspension of an ultraviolet light absorber to the surface of a plastic sheet. The methods disclosed by Jochanan include immersion, spraying, brushing, roller-printing and curtain-coating. However, with such methods, a large amount of residual stabilizer and solvent is left on the surface of the article, whereupon the modified surface is observed to be streaky, hazy, and has runs or pockmarks thereon.

Humphrey, in U.S. Pat. No. 4,146,658, describes a process for producing an ultraviolet light stabilized polycarbonate article by dipping the polycarbonate sheet into an impregnating solution consisting of a selected combination of ultraviolet absorber and solvent. However, all the disadvantages of the conventional dip method are present here, too.

Ching, in U.S. Pat. No. 4,349,607, describes the incorporation of certain U. V. stabilizers into thermoplastic resins by dipping spraying and brushing followed by heating at 70° C., which method is unsatisfactory for providing surface modified PVC sheets having a high degree of surface perfection.

Amborski, in U.S. Pat. No. 3,043,709, discloses an organic polymeric article having an ultraviolet light absorber compound incorporated adjacent to the surface fo the article. The article is treated by several methods, including dipping-coating a polyethylene terephthlate film in a stabilizer solution or, applying a dispersion or melt of the absorber, or applying the absorber as a powder, and, thereafter, the coated film is heated in air to 115° C. and above to drive the absorber below the surface of the film and to remove the solvent. These processes, however, are disadvantageous because they require heat-treatment to fully modify the surface of the film. Furthermore, these methods form an article in which considerable residual absorber is present on both sides of the film, which affects its surface perfection and appearance.

Fanning, in U.S. Pat. No. 3,297,462, discloses a process for rendering polymeric films resistant to the deteriorating effects of sunlight by immersing them in a solution of a benzophenone stabilizer in a solvent mixture of diethylene glycol and glycerine, and then washing successively in diethylene glycol and water. The polymers suitable for such treatment, however, must have a zero strength temperature of at least 200° C., which excludes many useful polymers, including polyvinyl chloride.

Solvay and Cie, in Belgium Patent No. 612,206, discloses a process for surface treating rigid polyvinyl chloride objects. The method comprises immersing the object in a swelling solvent containing a light stabilizer and then evaporizing the solvent in air. This procedure, however, is ineffective because some stabilizer remains on the treated surface of the object, which gives a poor physical appearance, and, environmental hazards are created during removal of the solvent in air.

Cohnen, in U.S. Pat. No. 3,892,889, describes a method of applying a solution of a U.V. stabilizer to polycarbonate resin sheets. Such treated polymers, however, also are marred by the presence of residual stabilizer on the surface of the article.

Chilton, in U.S. Pat. No. 4,323,597 teaches a flow-coating process for polycarbonate articles. In this process, the surface of the polycarbonate is heated and a liquid stabilizer composition, which is non-aggressive towards but wets the polycarbonate surface, is flowed over the heated surface. There is no indication in this patent, however, that the method is applicable to polyvinyl chloride.

Bristol, in U.S. Pat. No. 3,519,462, describes the treatment of polyvinyl chloride and other polymers with a solution of a U.V. stabilizer in a diol or triol. These solvents, however, are not efficient swelling agents for PVC. Furthermore, there is no recognition therein of the need for removing excess stabilizer solution present on the treated surface.

Chauffoureaux, in U.S. Pat. No. 3,783,011, diffuses a vapor of a U.V. stabilizer into the surface of polyvinyl chloride and other polymers. Unfortunately, the vapor treated surfaces have poor physical characteristics.

In summary, these and other processes have not provided useful U.V. stabilized articles, particularly polyvinyl chloride resin articles, for example, for residential siding, which use requires particularly effective protection from the weathering effects of sunlight, and an appearance and degree of surface perfection which is acceptable in commercial use.

Accordingly, there is a present need to effectively modify the exposed surface of a PVC sheet, such as residential siding, with a U.V. stabilizer. Such a surface modified, U.V. stabilized PVC siding article preferably should have only one side surface modified with the stabilizer material. Furthermore, the exposed surface of the sheet should be substantially free of residual stabilizer and solvent material, and the appearance and degree of surface perfection of the modified side should be the same as that of the unmodified side of the sheet. In addition, the surface modification should be effected in situ to lessen environmental hazards.

Accordingly, it is an object of this invention to provide a surface modified, U.V. stabilized resin sheet article having both sides exposed to the air, wherein the surface is substantially fully modified in situ with a stabilizing amount of a U.V. stabilizer material, the exposed surfaces are substantially free of residual stabilizer and solvent material, and the appearance and degree of surface perfection of the modified side are substantially the same as that of the unmodified side.

SUMMARY OF THE INVENTION

What is described herein is a surface modified, U.V. stabilized article which includes a resinous sheet whose sides are both exposed to the air. The surface region of one side of the sheet is substantially fully modified in situ with a stabilizing amount of an ultraviolet light stabilizer material, while the exposed surfaces are substantially free of residual stabilizer and solvent material, and the appearance and degree of surface perfection of the modified side are substantially the same as that of the unmodified side of the sheet.

The surface region of the sheet extends for a depth of up to 200 microns from the surface. This region is fully modified in situ in this invention with a stabilizing amount of a ultraviolet light stabilizer comprising at least 1.8 g/m$^2$ of the surface of the sheet, preferably 2.7 g. to 10.7 g./m$^2$. At least 70% of this stabilizing amount is present within the first 100 microns of the surface region.

In accordance with the invention, the U.V. stabilized resin article is made by a continuous process comprising immersing a resin body in a suitable liquid media, and contacting the surface of the immersed body through the liquid with a solution of a ultraviolet light stabilizer in a suitable organic solvent and displacing residual stabilizer and solvent from the modified surface in situ.

BRIEF DESCRIPTION OF THE DRAWINGS

The invention will be more clearly understood by referring to the following drawings, in which.

DETAILED DESCRIPTION OF THE INVENTION

Figure 1:
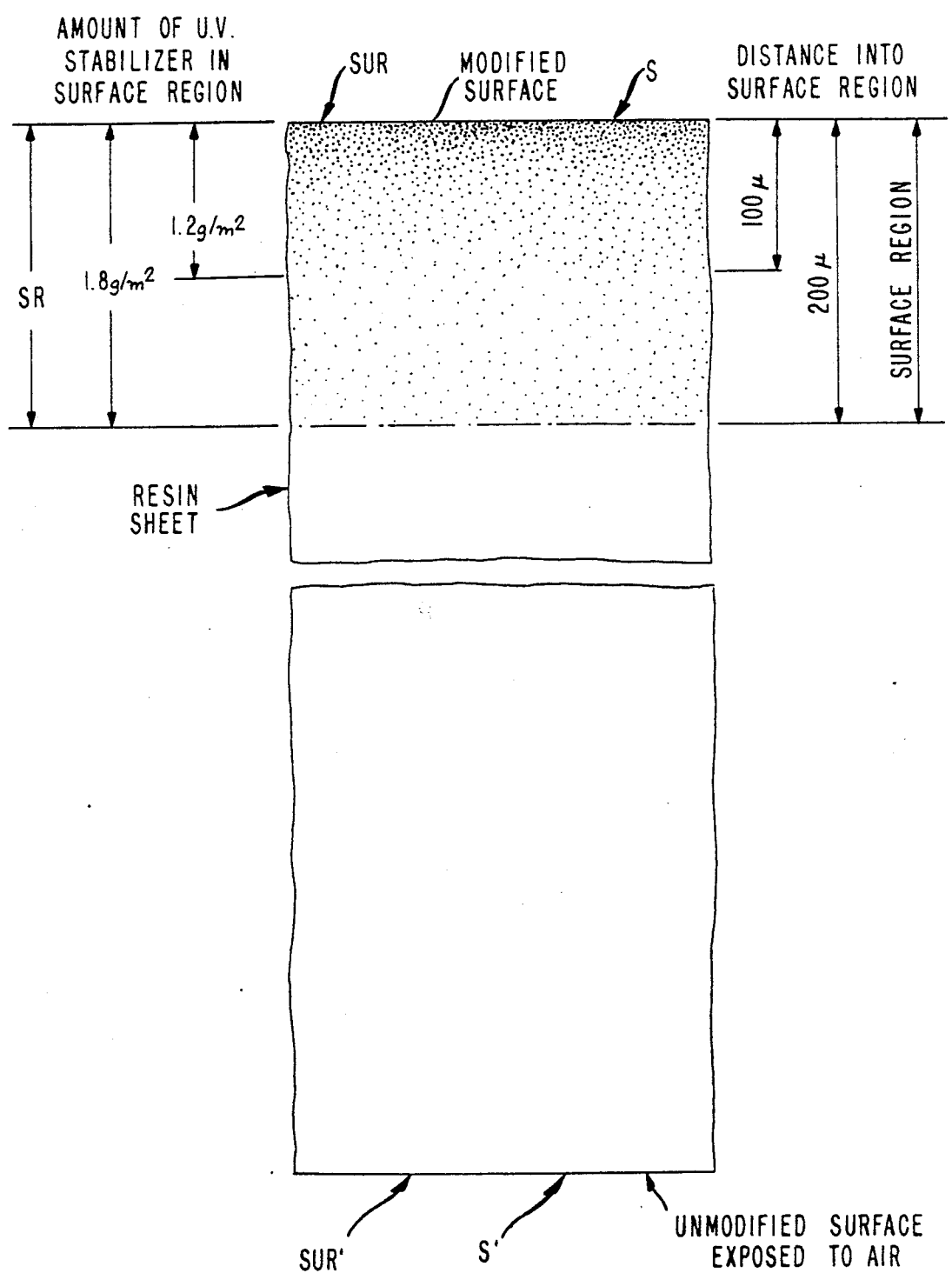
FIG. 1 shows the U.V. stabilized article of the present invention.
Figure 2:
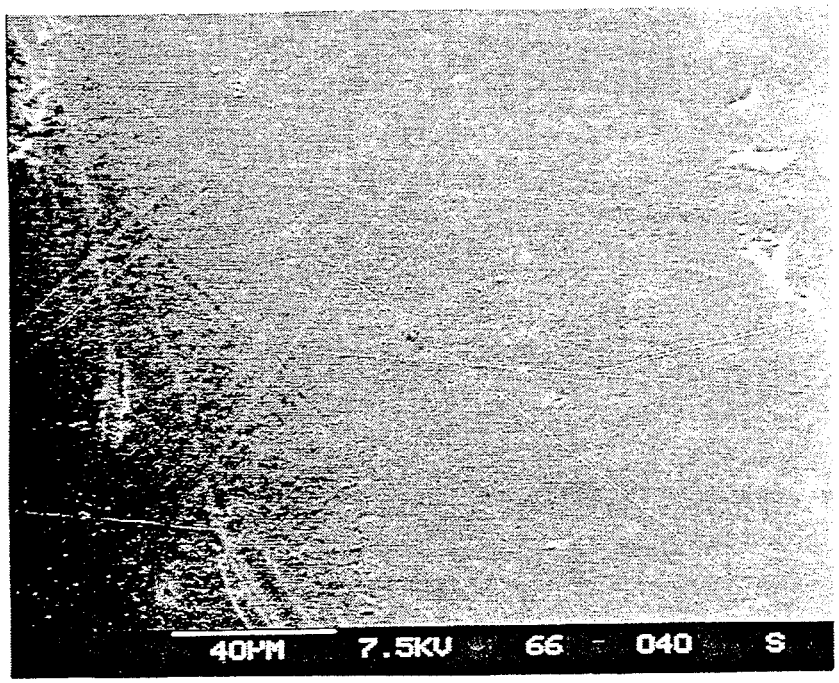
FIG. 2 is a scanning election micrograph of the modified surface of a stabilized PVC article in accordance with the present invention.

Referring now to the drawings, FIG. 1 shows the U.V. stabilized article of the present invention. The article includes a resin body, such as a sheet or other shaped structure thereof of polyvinyl chloride or another polymeric resin. The article has sides S and S', both of which are exposed to the air. Each exposed side has respective surfaces SUR and SUR'. Side S has a surface region SR extending from surface S to a depth of about 200 microns into said sheet. Surface region SR is modified with a stabilizing amount of a U.V. stabilizer material, which is an amount of at least 1.8 g./m$^2$ of the surface of the sheet, and preferably 2.7 g. to 10.7 g./m$^2$ thereof. 70% or more of the stabilizer is found within the first 100 microns of the surface region. Stabilizer is substantially absent in the interior or bulk of the sheet, and surface SUR also is substantially free of residual stabilizer.

The uniformity, appearance and degree of surface perfection of the modified surface SUR is substantially the same as that of the unmodified surface SUR'. Surface perfection is defined as a surface which is non-tacky and non-streaking, and which retains its original shape and hardness after being modified with stabilizer.

Figure 3:
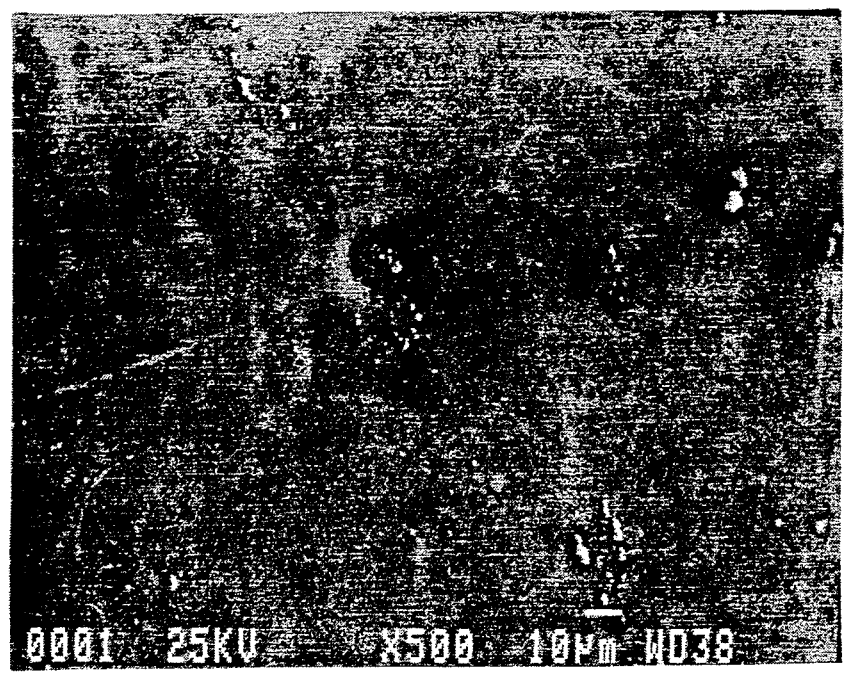
FIG. 3 shows the untreated surface of the sheet of FIG. 2.
Figure 4:
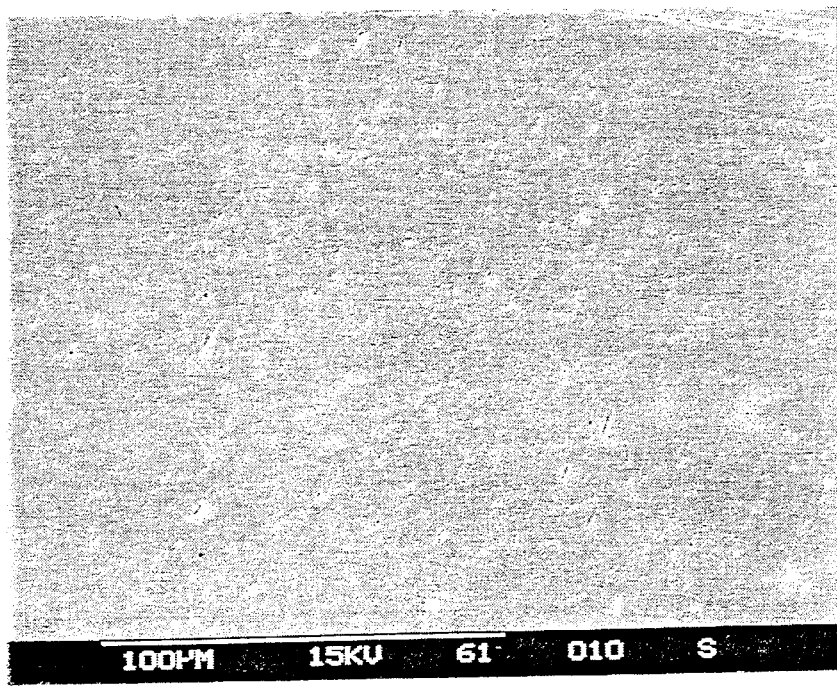
FIG. 4 shows the modified surface of FIG. 2 after weathering for 15 mos. in sunlight.
Figure 5:
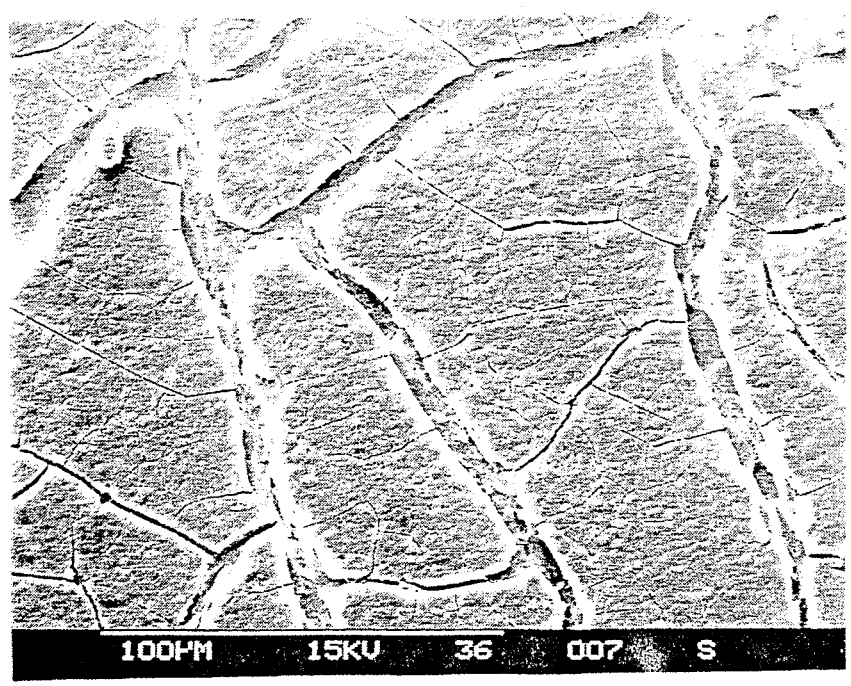
FIG. 5 shows the untreated surface of FIG. 3 after weathering for 15 mos. in sunlight.

Referring now to FIGS. 2–5, there are shown scanning electron micrographs of the modified surface SUR of the U.V. stabilized resin sheet (FIG. 2), its corresponding unmodified surface SUR' (FIG. 3), the modified surface after weathering (FIG. 4), and the unmodified surface after weathering (FIG. 5). These micrographs illustrate that the surface of the treated resin article herein (FIG. 2) has substantially the same degree of surface perfection as that of its untreated surface (FIG. 3). In addition, the treated surface (FIG. 4) remains substantially unaffected by exposure to ultraviolet light for a protracted period of time, while the untreated surface (FIG. 5), under similar conditions of exposure, has deteriorated perceptibly.

The shaped resin body itself is obtained by general mechanical processing techniques known to those skilled in the art. Illustrative of such mechanical operations are compression, injection, jet, transfer molding, vacuum forming, extrusion and the like. Such bodies can range from flexible sheets to rigid structural members. However, the invention is aimed particularly at articles which are plagued by U.V. degradation accompanying outdoor weathering, and, particularly, PVC residential siding.

Accordingly, polyvinyl chloride is the preferred resin for the article of the invention. However, other resins susceptible to impregnation with U.V. stabilizers also are suitable, including ABS(acrylonitrile/- butadiene/styrene) rubber, polypropylenes, polyacrylates, polymethacrylates and polyesters, e.g. polyethylene terephthlate and polybutylene terephthlate.

The resin article itself may be transparent, translucent, opaque or pigmented.

Figure 6:
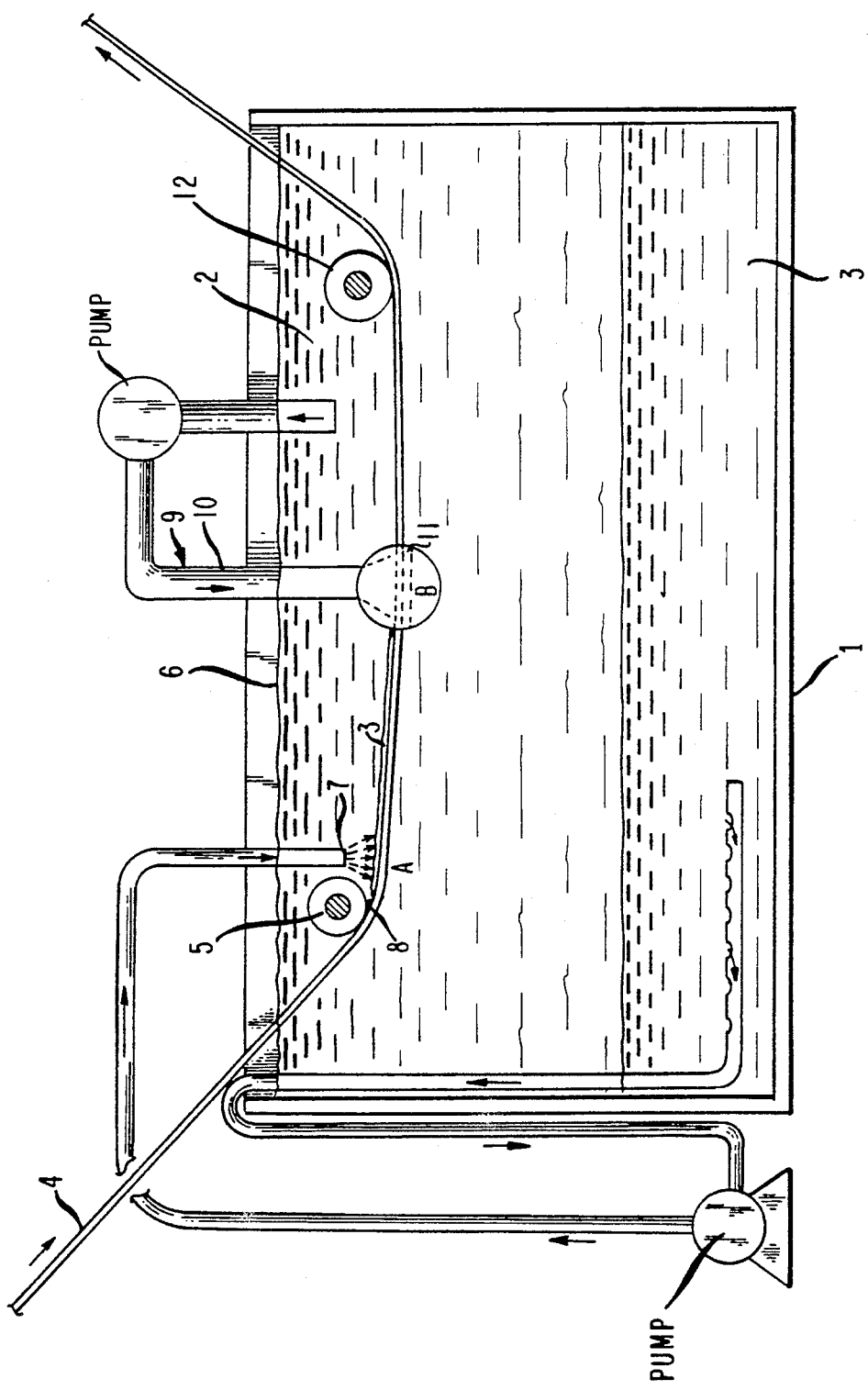
FIG. 6 is a schematic representation of an apparatus for making the U.V. stabilized article of FIG. 1 by a continuous process.

Referring now to FIG. 6, there is shown schematically an apparatus useful for making the U.V. stabilized resin article of the invention. In general, the method comprises immersing a resin sheet in a suitable liquid media, contacting the surface of the immersed sheet to be modified through the liquid with a solution of an ultraviolet light stabilizer in a suitable organic solvent, and displacing residual stabilizer and solvent from the treated surface in situ. Suitable solvents are those which swell the resin effectively and are immiscible with the organic solvent and nonaggressive towards the resin.

More particularly, the preferred in situ method of making the U.V. article of the invention is a continuous process which comprises immersing the resin sheet in an aqueous liquid, e.g. water, flowing a solution of an ultraviolet light stabilizer in a resin-swellable organic solvent through the water into contact with the surface of the sheet to be modified while it is immersed in the water, thereupon causing the surface contacted to swell sufficiently to allow the stabilizer solution to fully penetrate into the surface region of the sheet, and then displacing residual stabilizer and solvent from the modified surface in situ, preferably with said aqueous liquid.

After contacting the surface of the sheet, excess stabilizer solution falls or rises from the thus-treated surface. The particular direction will depend on the respective densities of the liquid and organic solvent employed. It is preferred to use liquids such as water or aqueous solutions thereof, and organic solvents having a density greater than water or such solutions. Accordingly, the preferred arrangement of liquid and solution is a two-layered system, where water is the upper layer, and the solution of stabilizer in the organic solvent is the lower layer.

The organic solvent is selected among solvents which do not mix with the liquid media; otherwise, the solvent would not reach the resin sheet but would simply dissolve therein. Another consideration in choice of solvent is an empirical one, namely, the desire to impregnate the resin article with the U.V. stabilizer within a minimum contact time. This property depends on a number of factors, particularly the ability of the solvent to effectively swell the resin surface.

The system shown in FIG. 6 is a two-layered system in which the liquid phase is the upper layer and the stabilizer solution is the lower layer, and the resin sheet is oriented in an immersed state in the upper layer. In operation of such a two-layered process in a continuous manner, the stabilizer solution is pumped from the lower layer and applied over the sheet from beneath the aqueous upper layer. Excess stabilizer solution then falls off the sheet by gravity to return to the lower layer. The organic solvent in the stabilizer solution is blocked from evaporating into the atmosphere by the blanket of liquid above it, which is advantageous for producing modified surfaces having a high degree of surface perfection, and for ecological reasons.

The apparatus of FIG. 6 includes tank 1 about ¾ full with water 2 as the upper layer. Stabilizer solution 3 of a U.V. absorber in an organic solvent, e.g. methylene chloride, is present as the lower layer therein. A continuous resin strip 4 of extruded polyvinyl chloride, for example, is fed into the upper layer at a predetermined rate from below roller 5, which is positioned below surface 6 of the water.

Further ahead of roller 5, in what is referred to herein as the "application zone" A, a series of applicator nozzles 7 are oriented below the surface level 6 of the water with their orifices directed towards the surface of strip 4. The applicator nozzles continuously direct a stream of stabilizer solution 3 over the upper surface 8 of the moving resin strip 4. The thus-applied stabilizer solution remains on the surface of the strip whereupon the surface region is modified effectively with stabilizer. The length of time the stabilizer solution remains on the surface of the sheet within the application zone is referred to herein as the "contact time" of the process, defined hereinafter.

Downstream of the applicator zone is a "displacement zone" B, in which residual stabilizer solution is removed in situ from the thus-treated surface of the strip. The term "in situ" means that the displacement step is carried out without exposing the treated surface to the ambient atmosphere; rather, the surface remains under water where the solvent cannot evaporate. Such evaporation would leave streaks of solid stabilizer material thereon which is highly undesirable.

The duration of passage from the applicator zone to the displacement zone is defined herein as the "contact time" of the process.

In the displacement zone, a jet element 9 directs a spray of displacing liquid, preferably water 2, at a pressure sufficient to displace residual stabilizer solution from the treated surface of the strip. Jet element 9 comprises a hollow, perforated rod 10 terminating in slit 11 through which strip 4 is conveyed into the displacement zone.

A second roller 12 is located ahead of the displacement zone and below the level of the water to accept the thus-treated resin strip after it leaves the displacement zone. Variable speed nip roller pullers (not shown) are positioned outside the tank to move the strip at a predetermined speed through and out of the tank, where it can be stored on a suitable take-up roll.

The equipment and procedure described above also is applicable to organic solvents having a density which is less than one, e.g. ethyl acetate, 2-pentanone, 3-pentanone and the like. For such organic solvents, the stabilizer solution would constitute the top layer and water the bottom layer. The stabilizer solution then would rise in the water to contact the resin sheet from the underside, thereafter passing upwardly.

The invention will be described now with the reference to the following examples, in which the U.V. stabilizer article of the present invention is prepared using the apparatus and system of FIG. 6.

PREPARATION OF U.V. STABILIZED ARTICLE OF INVENTION

Example 1

A solution of 7.5% by weight of Cyasorb U.V. 5411 stabilizer (a trademark of American Cyanamid Co.) in methylene chloride was applied onto the upper surface of a horizontally supported, moving polyvinyl chloride resin strip immersed in water at 25° C. The applicator nozzles were directed vertically towards the upper surface of the sheet from a position beneath the water level. Thereupon stabilizer was absorbed into the surface region of the upper surface of the sheet and excess solution fell to the bottom of the tank. The contact time was 24 seconds. Downstream of the applicator zone, a jet of water was applied to the treated surface to displace residual stabilizer and solvent still remaining on the treated surface. The U.V. stabilized article then exited the tank and was wound onto a take-up roll.

Example 2

Properties of U.V. Stabilized Article

The U.V. stabilized article prepared in Example 1 was microtomed into 20 micron sections extending to a total depth of 200 microns from the surface. The amount of U.V. stabilizer present in each of these sections was determined by means of high pressure liquid chromatography (HPLC) analysis. The results are given in Table I below.

TABLE 1

| | Concentration Profile of Stabilizer in Surface Region and Bulk of Sheet | | | |
|---|---|---|---|---|
| Section (microns) | % Stabilizer in Section | Amount of Stabilizer (g/m2) | Total Stabilizer at Given Depth (g/m$^2$) | % of Total Stabilizer at Given Depth |
| 0–20 | 2.30 | 0.64 | | |
| 20–40 | 1.91 | 0.52 | | |
| 40–60 | 1.70 | 0.47 | | |
| 60–80 | 1.47 | 0.40 | | |
| 80–100 | 1.40 | 0.38 | 2.42 | 71 |
| 100–120 | 1.30 | 0.36 | | |
| 120–140 | 1.17 | 0.32 | | |
| 140–160 | 0.62 | 0.17 | | |
| 160–180 | 0.32 | 0.09 | | |
| 180–200 | 0.14 | 0.04 | 3.39 | |

UV Stabilizer Solution
Stabilizer

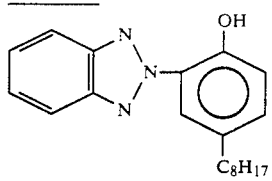

M.W. = 323.4

Cyasorb UV 5411 (Trademark of the American Cyanamid Co.)
Chemical Name: 2(2′-hydroxy-5′t-octylphenyl)-benzotriazole
Solution
7.5% by wt. of stabilizer in methylene chloride solvent.
Process Conditions
Temperature - 25° C.
Contact time - 24 sec.
Sheet speed - 1.5 ft./min.
Thickness of PVC Sheet - 1300 microns
Composition of PVC Sheet - 0% T$_i$O$_2$ The test results in Table I show that 3.39 g./m$^2$ of the stabilizer is deposited within the surface region of one side of the sheet, i.e. within a depth of 200 microns from the surface, and 71% of this amount, or 2.42 g./m$^2$, is present within the first 100 microns of the surface region. Within the interior or bulk of the sheet, i.e. from 200 to 1300 microns (the thickness of the sheet) substantially no stabilizer is present. Furthermore, residual stabilizer and solvent (less than 1% of each) are not present on the modified surface of the sheet. The resultant product had a uniform treated surface which was non-tacky, had no streaks of solid material thereon, and retained its original planarity and hardness.

Example 3

Following the procedures of Examples 1 and 2, various concentrations of stabilizer solutions were applied onto the upper surface of the PVC sheet during predetermined contact times. Table II shows the amount of the stabilizer incorporated into the surface region of the resin sheet for such various stabilizer concentrations and contact times using methylene chloride as the solvent.

The protection of the article against deterioration by U.V. light under these different process conditions is presented in Table II as changes in yellowness index (YI), or ΔYI values. The YI values were determined upon accelerated U.V. exposure tests, according to ASTM G 53-84. The change from initial to final YI is designted ΔYI. A ΔYI value of zero (or minus) indicates minimal or complete absence of yellow; positive ΔYI values evidences increasing yellowness caused by U.V. exposure.

TABLE II

Effect of Concentration of Stabilizer and Contact Time on Amount of Stabilizer Incorporated into Surface Region of Sheet and its U.V. Stability

| Sample No. | Stabilizer Conc. (% wt./vol) | Contact Time (sec.) | Amount of Stabilizer (g/m$^2$) | Δ YI U.V. exposure (in weeks) | |
|---|---|---|---|---|---|
| | | | | 1 | 4 |
| 1 | 2 | 30 | 1.78 | 1.3 | 4.1 |
| 2 | 3 | 30 | 2.67 | −2.9 | −2.0 |
| 3 | 3 | 60 | 3.38 | 2.2 | −0.4 |
| 4 | 5 | 15 | 5.16 | −1.0 | 0.3 |
| 5 | 5 | 30 | 5.34 | 0.0 | 1.2 |
| 6 | 5 | 60 | 7.12 | −0.8 | −1.0 |
| 7 | 10 | 15 | 11.22 | 0.7 | −1.1 |
| 8 | 10 | 30 | 9.80 | −1.0 | 0.9 |
| 9 | 10 | 60 | 16.86 | −0.6 | −1.4 |
| Control | 0 | 0 | 0 | 29 | 50 |

The results in Table II show that application of stabilizer solution having a concentration of 2 wt. % for 30 sec. provides an amount of stabilizer in the surface region of the sheet sufficient to afford excellent protection agains U.V. light. At concentrations up to 10 wt. % of stabilizer, and for contact times up to 1 min., even more effective U.V. protection is achieved.

As described, the preferred liquid media in the method used herein is water or an aqueous solution or emulsion thereof. Other liquids, however, can be used as long as they are "incompatible" with the organic solvent. The term "incompatible" is defined herein to mean a liquid having a solubility of no more than about 15 percent by weight in the organic solvent and at ambient temperature and pressure. Such liquids include alkanols and other water miscible liquids.

Similarly, the solvent in the stabilizer solution should be "liquid-immiscible solvent", which also is defined as a solubility in liquid at ambient temperature and pressure of no more than about 15 per cent by volume.

Accordingly, organic solvents suitable for use herein include water-immiscible organic solvents, as for example, halogenated hydrocarbons having up to six, preferably three, carbon atoms in the chain; ketones, both aliphatic and cycloaliphatic; aliphatic esters and the like. Representative halogenated hydrocarbons include methylene chloride, chloroform, 1,2-dichloroethane, 2-chloro-2-methylpropane and like chlorinated hydrocarbons. Exemplary ketones are 2-pentanone, 3-pentanone, 2-hexanone, 2,4-pentanedione and the like. Suitable ethers include diethyl ether, dipropyl ether, dimethoxy ethane, furan, tetrahydropyran and the like. Mixtures of mutually miscible organic solvents can also be used. The preferred organic solvents are methylene chloride, 1,2-dichloroethane, ethyl acetate, 2-pentanone and 3-pentanone, and mixtures of these solvents.

Suitable U.V. stabilizers include the following commercially available materials:

Cyasorb U.V. 9: 2-hydroxy-4-methoxybenzophenone (Trademark of American Cyanamid)
Cyasorb U.V. 531: 2-hydroxy-4-n-octoxybenzophenone (Trademark of American Cyanamid)
Cyasorb U.V. 5411: 2(2'-hydroxy-5'-t-octylphenyl)benzotriazole (Trademark of American Cyanamid)
Tinuvin P: 2(2'hydroxy-5'-methylphenyl)benzotriazole (Trademark of Ciba-Geigy)
Tinuvin 326: 2-(3't-butyl-2'-hydroxy-5'-methylphenyl)-5-chlorobenzotriazole (Trademark of Ciba-Geigy)
Sanduvor VSU: 2-ethyl-2-ethoxyanilide (Trademark of Sandoz Corp.)
Tinuvin 144 and 770: hindered amine light stabilizers (Trademark of Ciba Geigy for HALS)
Irgastab 2002: a nickel phosphate (Trademark of Ciba-Geigy)

The following is a partial list of these and other benzophenones and triazoles which are suitable U.V. stabilizers for use herein.

2,2'-dihydroxybenzphenone
2,2,4,4'-tetrahydroxybenzophenone
2,2'-dihydroxy-4,4'-dimethoxybenzophenone
2,2'-dihydroxy-4,4'-diethoxybenzophenone
2,2'-dihydroxy-4,4'-dipropoxybenzophenone
2,2'-dihydroxy-4,4'-dibutoxybenzophenone
2,2'-dihydroxy-4-methoxy-4'-ethoxybenzophenone
2,2'-dihydroxy-4-methoxy-4'-propoxybenzophenone
2-hydroxy-4,4',5'-trimethoxybenzophenone
2-hydroxy-4-ethoxy-4'-methylbenzophenone
2-hydroxy-4-ethoxy-4'-ethylbenzophenone
2-hydroxy-4-ethoxy-4'-propylbenzophenone
2-hydroxy-4-ethoxy-4'-methoxybenzophenone
2-hydroxy-4,4-diethoxybenzophenone
2-hydroxy-4-ethoxy-4'-propoxybenzophenone
2-hydroxy-4-ethoxy-4'-butoxybenzophenone
2-hydroxy-4-ethoxy-4'-chlorobenzophenone
2-hydroxy-4-ethoxy-4;-bromobenzophenone
2-(2'-hydroxy-5'-methylphenyl)benzotriazole
2-(2'-hydroxy-5'-t-butylphenyl)benzotriazole
2-(2'-hydroxy-3'-methyl-5-t'-butylphenyl)benzotriazole
2-(2'-hydroxy-5'-cyclohexylphenyl)benzotriazole
2-(2'-hydroxy-3',5'-dimethylphenyl)benzotriazole
2-(2'-hydroxy-5'-t-butylphenyl)-5-chlorobenzotriazole and
2-(2'-hydroxy-3'-di-t-butylphenyl)benzotriazole
2,2'-dihydroxy-4-methoxy-4'-butoxybenzophenone
2,2'-dihydroxy-4-ethoxy-4'-propoxybenzophenone
2,3'-dihydroxy-4,4'-dimethoxybenzophenone
2,3'-dihydroxy-4-methoxy-4'-butoxybenzophenone
2,3'-dihydroxy-4,4,5'-trimethoxybenzophenone
2-hydroxy-4,4,5'-trimethoxybenzophenone
2-hydroxy-4,4,6,'-tributoxybenzophenone
2-hydroxy-4-ethoxy-2,4'-dibutylbenzophenone
2-hydroxy-4-propoxy-4,6'-dichlorobenzophenone
2-hydroxy-4-propoxy-4',6'-dibromobenzophenone
2,4-dihydroxybenzophenone
2-hydroxy-4-methoxybenzophenone
2-hydroxy-4-ethoxybenzophenone
2-hydroxy-4-propoxybenzophenone
2-hydroxy-4-butoxybenzophenone
2-hydroxy-4-methoxy-4'methylbenzophenone
2-hydroxy-4-methoxy-4'propylbenzophenone
2-hydroxy-4-methoxy-4'butylbenzophenone
2-hydroxy-4-methoxy-4'-t-butylbenzophenone
2-hydroxy-4-methoxy-4'-chlorobenzophenone
2-hydroxy-4-methoxy-2'-chlorobenzophenone
2-hydroxy-4-methoxy-4'-bromobenzophenone
2-hydroxy-4,4'-dimethoxybenzophenone
2-hydroxy-4,4'-dimethoxy-3-methylbenzophenone
2-hydroxy-4,4'-dimethoxy-3-methylbenzophenone
2-hydroxy-4,4'-2'-ethylbenzophenone
2-hydroxy-acetophenone The preferred temperature for making the U.V. stabilized article of the present invention is ambient temperature. However, process temperatures lower and higher than ambient temperature may be used, if desired. For example, the water solubility of certain useful organic solvents, e.g. ethyl acetate, decreases with increasing temperature. Thus, it may be advantageous to use process temperatures higher than ambient temperature for such solvents. Similarly, organic solvents which swell a particular resin only modestly at room temperature can be rendered quite effective for infusion of the requisite amount of stabilizer into the surface region of the resin by raising the treatment temperature.

Although the preferred embodiment of the stabilizer article herein has only one side of the article modified with stabilizer, it is understood that both sides may be modified, if desired, by directing jets of stabilizer solution towards both surfaces of the resin sheet.

The invention is applicable also to resin article impregnated with additives other the U.V. stabilizers. For example, resins can be impregnated with such additives as anti-static agents, anti-oxidants, anti-block agents, dyes, slip additives, and the like.

Although the invention has been described in its preferred forms with a certain degree of particularity, it is understood that the present disclosure has been made only by way of example and that numerous changes can be made without departing from the spirit and the scope of this invention.

We claim:

1. A process for producing a surface modified resin article which comprises immersing a resin-body in a suitable liquid media, said liquid media being nonagressive towards said resin;

applying a solution of modifier material comprising an ultraviolet light stabilizer in a solvent to a surface of said resin body; and displacing residual modifier and solvent from the thustreated surface in situ;

both steps being carried out in an environment which is non-evaporative of said solvent.

2. A process according to claim 1 wherein both steps are carried out in the absence of air.

3. A process according to claim 1 wherein said modifier is a U.V. stabilizer.

4. A process according to claim 3 wherein said stabilizer is present within said surface in a stabilizing amount of at least 1.8 g/m² of said surface.

5. A process according to claim 4 wherein said stabilizing amount is about 2.8 to 10.7 g/m².

6. A process according to claim 1 wherein said resin is polyvinyl chloride.

7. A process according to claim 1 wherein said process is carried out in a continuous manner on a moving resin sheet.

8. A process according to claim 1 wherein said solvent is a volatile organic solvent.

9. A process according to claim 1 wherein said solvent is methylene chloride.

10. A process according to claim 1, wherein said displacing is carried out with water.

* * * * *